(12) United States Patent
Kruttschnitt et al.

(10) Patent No.: US 7,905,317 B2
(45) Date of Patent: Mar. 15, 2011

(54) SUPERIMPOSED STEERING SYSTEM FOR A VEHICLE

(75) Inventors: Andreas Kruttschnitt, Heidenheim (DE); Arthur Rupp, Huettlingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 928 days.

(21) Appl. No.: 10/581,976

(22) PCT Filed: Dec. 2, 2004

(86) PCT No.: PCT/EP2004/013710
§ 371 (c)(1),
(2), (4) Date: May 14, 2007

(87) PCT Pub. No.: WO2005/054035
PCT Pub. Date: Jun. 16, 2005

(65) Prior Publication Data
US 2007/0209861 A1    Sep. 13, 2007

(30) Foreign Application Priority Data
Dec. 6, 2003   (EP) .................................... 03028023
Jan. 23, 2004  (DE) ......................... 10 2004 003 582

(51) Int. Cl.
*B62D 5/04* (2006.01)
(52) U.S. Cl. ....................................... 180/444; 180/443
(58) Field of Classification Search .................. 180/443, 180/444, 446; 74/640, 388 PS
See application file for complete search history.

(56) References Cited

U.S. PATENT DOCUMENTS

| 4,223,254 A * | 9/1980 | Adams ............................. 318/2 |
| 6,012,347 A | 1/2000 | Hasegawa |
| 6,029,768 A | 2/2000 | Kiyosawa et al. |
| 6,273,211 B1 | 8/2001 | Engels et al. |
| 7,041,022 B2 | 5/2006 | Bock et al. |
| 7,178,427 B2 * | 2/2007 | Christensen ................... 74/640 |

(Continued)

FOREIGN PATENT DOCUMENTS

DE    197 48 667    5/1998

(Continued)

OTHER PUBLICATIONS

European Search Report, issued in corresponding European Patent Application No. 03028023.

(Continued)

*Primary Examiner* — Anne Marie M Boehler
(74) *Attorney, Agent, or Firm* — Kenyon & Kenyon LLP

(57) ABSTRACT

A superimposed steering system for a vehicle, e.g., a servo-assisted or power steering system for a motor vehicle, includes a differential drive, which is configured as a shaft drive and has a first input shaft and a second input shaft, for superimposing the rotational angles that occur in the first and second input shafts on an output shaft of the differential drive. The output shaft acts on an input shaft of a steering gear. The first input shaft interacts with a steering handle by a steering shaft and the second input shaft interacts with a servo motor. A superimposed steering system may apply an additional steering angle, without play, to the output shaft and may have a simple, cost-effective, space-saving construction, while being easy to install. The first input shaft is directly connected in a detachable manner to a radially flexible flex-spline of the shaft drive, the first input shaft passing through an eccentric drive core of the shaft drive, which extends into the radially flexible flex spline.

25 Claims, 3 Drawing Sheets

U.S. PATENT DOCUMENTS

| | | | |
|---|---|---|---|
| 7,303,045 B2 * | 12/2007 | Yamamori et al. | 180/444 |
| 2006/0213320 A1 * | 9/2006 | Menjak et al. | 74/640 |

FOREIGN PATENT DOCUMENTS

| | | |
|---|---|---|
| DE | 695 05 983 | 7/1999 |
| DE | 102 20 123 | 12/2002 |
| DE | 101 29 450 | 1/2003 |
| DE | 101 60 313 | 3/2003 |
| DE | 102 53 465 | 1/2004 |
| EP | 0 630 800 | 12/1994 |
| EP | 0 770 192 | 11/1998 |
| EP | 1 013 534 | 6/2000 |
| EP | 1 167 093 | 1/2002 |
| EP | 1 384 648 | 1/2004 |
| WO | 04/000629 | 12/2003 |

OTHER PUBLICATIONS

Written Opinion, PCT International Application No. PCT/EP2004/013710 (English-language translation provided).

International Preliminary Report on Patentability, PCT International Application No. PCT/EP2004/013710 (English-language translation provided).

International Search Report, PCT International Application No. PCT/EP2004/013710.

* cited by examiner

SUPERIMPOSED STEERING SYSTEM FOR A VEHICLE

FIELD OF THE INVENTION

The present invention relates to a superimposed steering system for a vehicle, e.g., a power steering system or a power assistance steering system for a motor vehicle.

BACKGROUND INFORMATION

Certain superimposed steering systems are conventional and an aspect of which is that, if required, a further rotational angle can be superimposed by an actuator on the steering angle which is selected on a steering handle by a driver of a vehicle. The additional rotational angle is controlled by an electronic control and/or regulating device and serves to increase the driving stability of the vehicle or other purposes.

In order to produce an additional angle or a further rotational angle, it is described in German Published Patent Application No. 101 29 450 and German Published Patent Application No. 101 60 313 to use a planetary gear mechanism as variable ratio gear unit, a steering shaft which is connected to a first gear unit input shaft being disconnected axially and being connected rotatably by a multistep planet which moves around sun gears of the steering shaft parts. The multistep planets are mounted in a planetary gear carrier. The planetary gear carrier can in turn be moved about the steering shaft and its sun gears with a helical gear mechanism or a worm gear mechanism, the rotational movement of the planetary gear carrier being carried out with the aid of a helical gear or worm on a second gear unit input shaft of the variable ratio gear unit.

Variable ratio gear units of this type have a large number of toothing engagements. This results in gear unit play which can produce undesirable steering play. In addition, the above-described variable ratio gear units with servomotor are relatively complicated and expensive in technical terms.

German Published Patent Application No. 102 20 123 describes a superimposed steering system, an electric servomotor drive being integrated into a steering column shaft which connects a steering wheel to a steering gear. The electric servomotor drive has a housing which is connected to a first section of the steering column shaft and a drive shaft which is connected to a second section of the steering column shaft. The first section of the steering column shaft is connected to a steering wheel and the second section is connected to the steering gear, or vice versa. The drive shaft can be rotated by the electric servomotor drive relative to the housing of the electric servomotor drive, in order to produce an additional rotational angle. Although an additional angle is superimposed with this superimposed steering system on a rotational movement between the steering wheel and the steering gear, the opposing torque of the electric servomotor drive is supported on the steering column shaft, which can lead to an uncomfortable steering or driving sensation for a driver.

Superimposed steering systems are conventional which have a harmonic drive or pulsator drive as variable ratio gear unit. However, the servomotor of harmonic drives of this type supports its torque on the steering column. In addition, these harmonic drives require a stable housing in order to transmit the torque and the rotational angle at the steering handle to the gear unit output shaft of the variable ratio gear unit.

SUMMARY

Example embodiments of the present invention may provide a playfree superimposed steering system for a vehicle, which superimposed steering system may provide comfortable handling, may have a simple construction and the installation space for which may be minimized.

For this purpose, the variable ratio gear unit may be configured without a housing, in that the torque and the rotational angle on the steering handle and the first gear unit input shaft are transmitted directly to the radially flexible flexspline of the harmonic drive via a releasable connection. Here, the first gear unit input shaft penetrates an eccentric, e.g., elliptical drive core of the harmonic drive, which drive core protrudes in the radial direction in the manner of a cam into the radially flexible flexspline and is connected fixedly in terms of rotation to the second gear unit input shaft and the servomotor.

The harmonic drive has a first gear unit input shaft which is connected fixedly in terms of rotation to the steering shaft and the steering handle of the vehicle. The second gear unit input shaft is configured as a hollow shaft which is driven by the servomotor. The second gear unit input shaft is connected fixedly in terms of rotation to the eccentric, e.g., elliptical drive core of the harmonic drive. The eccentric drive core engages axially into the radially flexible flexspline of the harmonic drive, one or more circumferential sections of an outer circumferential surface of the radially flexible flexspline being engaged in a continuously changing manner with a substantially cylindrical supporting surface of a circular spline which is connected fixedly in terms of rotation to the gear unit output shaft.

The steering shaft is thus separated in the axial region of the circular spline of the harmonic drive into a first gear unit input shaft which is connected fixedly in terms of rotation to the steering handle and into a gear unit output shaft which is connected fixedly in terms of rotation to the circular spline.

The gear unit output shaft is connected fixedly to the circular spline and may be arranged rotatably in a frame or housing of the harmonic drive. In this manner, it is made possible for the gear unit output shaft to rotate relative to the first gear unit input shaft, as a result of which a positive or negative steering angle may be input into the steering shaft in addition to the steering angle which is input by the driver at the steering handle.

In order to simplify the assembly of the harmonic drive and in order for it to be possible for individual components to be exchanged rapidly, the first gear unit input shaft is connected releasably to the eccentric flexspline. In addition, this may provide that the individual components of the harmonic drive may be formed from different materials and conventional manufacturing methods may continue to be usable for the components. In order to improve the operating comfort of the steering system, there is provision for the torque of the servomotor to be supported on a component, fixed to the vehicle, of the steering system or the vehicle, which is not the steering column itself.

The radially flexible flexspline may be fixed in a form-fitting and releasable manner on the first gear unit input shaft, for simple assembly and possible maintenance-induced dismantling with the aid of a connecting element, such as a threaded bolt. A clutch plate which brings about a form-fitting connection which is fixed in terms of rotation is arranged or clamped between the radially flexible flexspline and the first gear unit input shaft. The clutch plate engages with latching elements in a form-fitting manner into the first gear unit input shaft and the radially flexible flexspline. The eccentric drive core which is connected fixedly in terms of rotation to a shaft of the servomotor is mounted rotatably on the first gear unit input shaft via roller bearings at its axial ends.

The eccentric drive core is arranged radially between the first gear unit input shaft and the radially flexible flexspline and is configured to be as compact as possible radially in order to reduce the installation space requirement of the steering system.

The eccentric drive core may engage axially over a large part into the radially flexible flexspline and into the, e.g., bell-shaped circular spline. This may result in an axially and radially compact construction of the harmonic drive and the steering system. The eccentric drive core rolls with a flexible ball bearing in the radially flexible flexspline and deforms the latter in a continuously changing manner. Here, as a function of the cross-sectional shape of the drive core, one or more circumferential sections of the outer circumferential surface of the radially flexible flexspline are in engagement with a substantially cylindrical supporting surface of the circular spline. The circular spline surrounds the flexspline radially. As the circumference of the outer circumferential surface of the radially flexible flexspline is shorter than the circumference of the cylindrical supporting surface of the circular spline, the circular spline, and thus also the gear unit output shaft, rotates by this length difference, the gear unit output shaft being connected fixedly in terms of rotation to the circular spline and in turn being connected to the input shaft of the steering gear. As a result, it is possible for an additional steering angle in the positive or negative direction with respect to the steering angle which is input on the steering handle to be applied with great precision to the circular spline and the gear unit output shaft.

One or more roller bearings of the eccentric drive core are prestressed axially on the first gear unit input shaft, in order to position said eccentric drive core without play. The axial prestressing may take place with a disk spring which is supported axially on an outer or inner ring of the roller bearing and on the clutch plate. For the, e.g., floating mounting of the first gear unit input shaft, the latter is mounted via a bearing at one axial end of the gear unit output shaft. The bearing may be configured as a needle bush. A bearing journal which may be released in a form-fitting manner may engage into the bearing at the axial end of the first gear unit input shaft. The bearing journal has a flats width or an engagement possibility which deviates from the circular shape for a tool, such as a hexagon socket, and thus at the same time forms the fastening element for the form-fittingly releasable fixing of the clutch plate and the radially flexible flexspline on the first gear unit input shaft.

It may be provided to arrange the servomotor with its housing separately from the housing of the harmonic drive and to connect the servomotor shaft to the eccentric drive core via a gear unit which may have a decelerative transmission ratio. The gear unit may be configured as a gear mechanism, such as a spur gear mechanism, a helical gear mechanism or a bevel gear mechanism, etc. Here, the eccentric drive core may be of one-piece configuration with a gear wheel of the gear unit at one axial end. The gear unit may also be configured as a flexible drive mechanism with all suitable and flexible drive devices, such as toothed belts, V-belts, chains, etc., it being possible for the eccentric drive core to be of one-piece configuration with a pulley wheel or a chain sprocket.

It may be provided to configure the servomotor as a hollow shaft motor, a rotor of the servomotor being arranged rotatably about the steering shaft. Here, the hollow shaft of the servomotor may be formed in one piece with the eccentric drive core and may end with the latter in the radially flexible flexspline.

The servomotor is actuated by a control and/or regulating device, the input side of the control and/or regulating device being connected in a signal transmitting manner to a sensor for determining the steering torque, to a sensor for determining the steering angle and/or to a sensor for determining the rotational angle of the steering handle. It may be provided to configure the sensors as contactless sensors and to configure the steering system as a parameter controlled power steering system or power assistance steering system. The servomotor, the control and/or regulating device, the harmonic drive and the sensors for determining the rotational angle and torque of the steering handle may be combined in one housing. The individual components may be arranged separately in the housing in a manner which is shielded from one another.

The overall construction of the superimposed steering system makes it possible for current to be supplied and/or signals to be forwarded between the components of the steering system without additional current guiding devices such as sliders or flat spiral springs, etc. This may result in an increase in the operational reliability of the steering system.

The harmonic drive may be formed predominantly from steel; at least the radially flexible flexspline and the drive core are formed from this material. It may also be provided to form components of the harmonic drive from a nonmetal or a nonferrous metal material. The outer circumferential surface of the radially flexible flexspline may engage into the cylindrical supporting surface of the circular spline with a form-fitting or force-transmitting connection. For the form-fitting engagement, it may be provided to provide the outer circumferential surface of the radially flexible flexspline with an external toothing system and to provide the cylindrical supporting surface of the circular spline with an internal toothing system. The circular spline having the internal toothing system has a greater number of teeth than the outer circumferential surface of the radially flexible flexspline which is in engagement with the internal toothing system of the circular spline with at least two diametrically opposite circumferential sections of its external toothing system. As a result of the rotation of the eccentric or elliptical drive core in the radially flexible flexspline, all the teeth of the external toothing system of the radially flexible flexspline are brought into contact one after another with the teeth of the internal toothing system of the circular spline during every revolution, as a result of which the circular spline with the gear unit output shaft is rotated by the difference in the number of teeth. Decelerative transmission ratios of approximately from 1:20 to 1:600 may be achieved with a gear stage of the harmonic drive, it being possible for a plurality of gear stages to be connected one after another. Many teeth are in engagement at the same time, with the result that, given the high degree of overlapping, multiple torque loading over comparable gear units is made possible and the harmonic drive has a correspondingly small overall size, and reliable, playfree torque and rotational angle transmission may be ensured between the first gear unit input shaft and the gear unit output shaft of the steering shaft as a result of the harmonic drive. If the outer circumferential surface of the flexspline is in frictional engagement with the supporting surface of the circular spline, any desired transmission ratios may be selected within certain limit ranges.

The variable ratio gear unit may be arranged between a steering valve and the steering gear or between the steering handle and the steering valve in the case of a hydraulic power assistance steering system. The variable ratio gear unit may be arranged between a steering moment sensor and the steering gear or between the steering handle and the steering gear in the case of an electric power assistance steering system.

It may also be provided to install the harmonic drive into the steering shaft or the drive train between the steering handle and the steering gear such that the steering handle is connected fixedly in terms of rotation to the circular spline and the radially flexible flexspline is connected fixedly in terms of rotation to the gear unit output shaft of the variable ratio gear unit.

Example embodiments of the present invention are explained in greater detail below with reference to the appended Figures.

DETAILED DESCRIPTION

Figure 1:
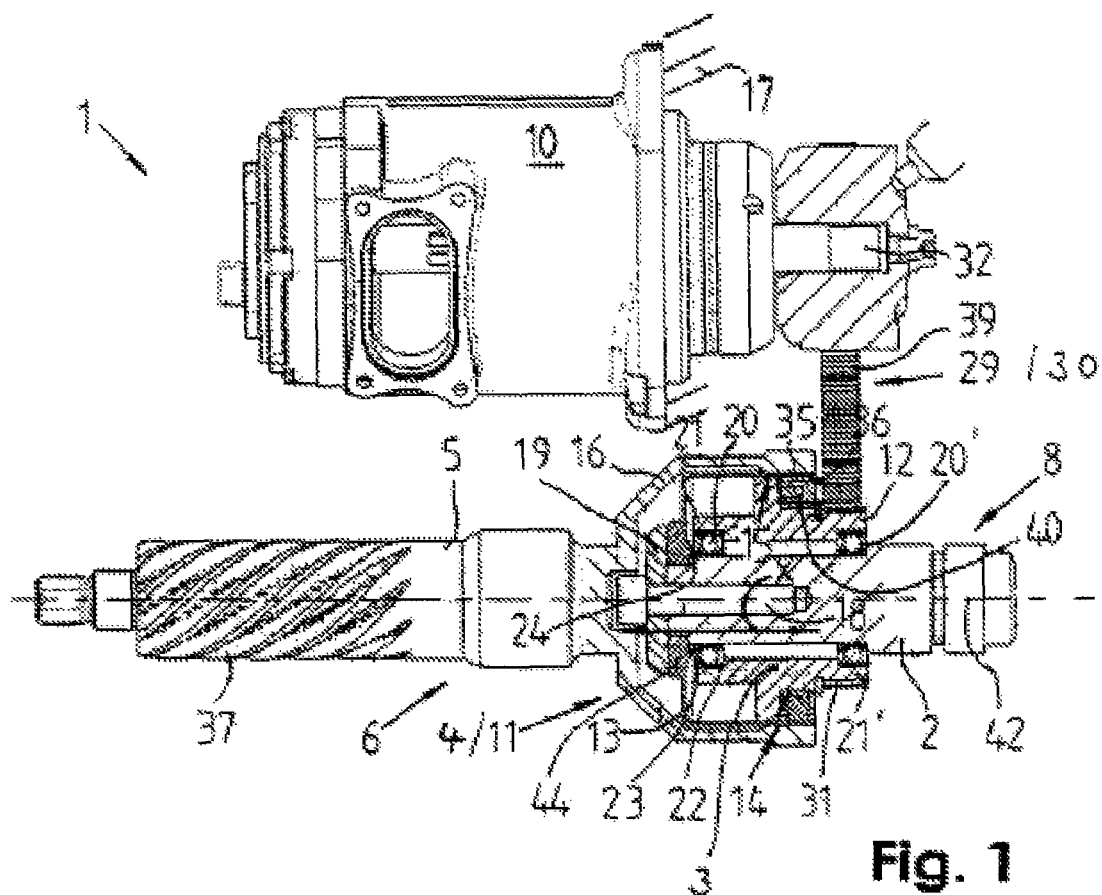
FIG. 1 is a plan view and a partial longitudinal cross-sectional view through a superimposed steering system according to an example embodiment of the present invention.

FIG. 1 illustrates a superimposed steering system 1 for a vehicle which is configured as active steering, in a plan view and a partial longitudinal cross-sectional view. The superimposed steering system 1 is formed as an electric superimposed steering system from a servomotor 10 which is supported on a component 17 which is fixed to the vehicle and is not the steering column of the vehicle, from a steering shaft 8 which is connected fixedly in terms of rotation to a steering handle 9, from a variable ratio gear unit 4 which is configured as a harmonic drive 11, and from an input shaft 6 for a steering gear 7. The steering gear 7 may be part of an electric or hydraulic power assistance steering system.

In the exemplary embodiment illustrated, the steering gear 7 includes a helically toothed pinion 37 which is arranged at one axial end of the input shaft 6, and a rack 38 which is mounted so as to be axially displaceable and with which the pinion 37 meshes. The rack 38 is fastened, e.g., in a conventional and articulated manner to steerable wheels of the vehicle with track rod arms.

Figure 2:
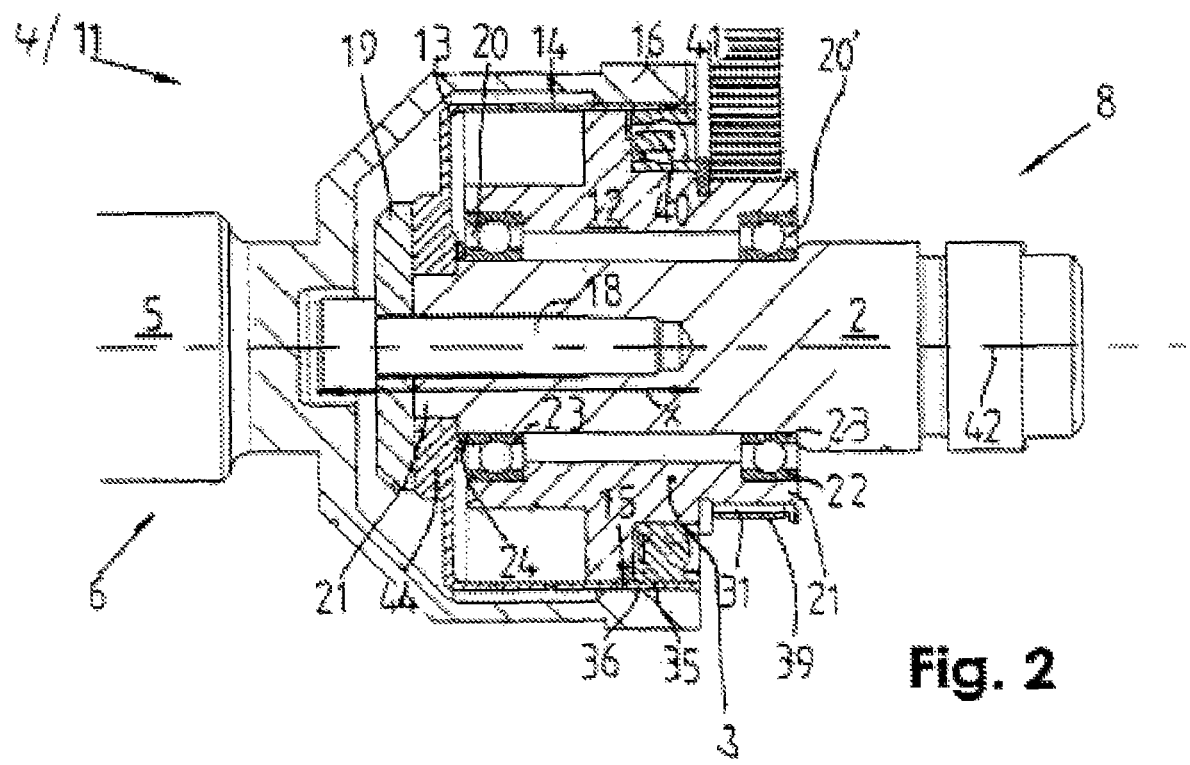
FIG. 2 is a longitudinal cross-sectional view through a harmonic drive of the superimposed steering system illustrated in FIG. 1.

The servomotor shaft 32 of the servomotor 10 is connected to the harmonic drive 11 via a gear unit 29 which is configured as a flexible drive mechanism 30. The servomotor 10 provides an additional steering angle to the harmonic drive 11, a toothed belt 39 transmitting the torque and the rotational speed of the servomotor 10 to a pulley wheel 31 of the harmonic drive 11 in the exemplary embodiment which is illustrated in FIGS. 1 and 2. The pulley wheel 31 is part of the gear unit 29 and is formed in one piece with a second gear unit input shaft 3 and an eccentric, e.g., elliptical drive core 12. The drive core 12 is formed elliptically at its axial region which adjoins the pulley wheel 31 immediately.

A flexible ball bearing 40 is mounted around the elliptical circumference of drive core 12. By its axial extent from the pulley wheel 31, the drive core 12 engages into a cupshaped, radially flexible flexspline 13 which is formed from resilient steel sheet. The drive core 12 is arranged rotatably on the first gear unit input shaft 2 via roller bearings 20, 20' which are arranged in each case at its axial ends 21, 21' and are formed as groove ball bearings. The radially flexible flexspline 13 has an outer circumferential surface 14 which bears an external toothing system 35 in the axial region of the ball bearing 40. Under the effect of the elliptical widening of the flexspline 13, two circumferential sections 41 of the external toothing system 35 engage in an internal toothing system 36 on a cylindrical supporting surface 15 of a circular spline 16 which is connected fixedly in terms of rotation to the input shaft 6 and a gear unit output shaft 5 of the harmonic drive 11. The circular spline 16 is arranged concentrically with respect to the longitudinal axis 42 of the steering shaft 8 on the input shaft 6 of the steering gear 7 or the gear unit output shaft 5. When the drive core 12 rotates, the elliptical widening takes place in a continuously changing manner along the internal toothing system 36. The circular spline 16 which has an internal toothing system has a greater number of teeth than the radially flexible flexspline 13, as a result of which the circular spline 16 is rotated by the difference in the number of teeth per revolution of the drive core 12.

Figure 3:
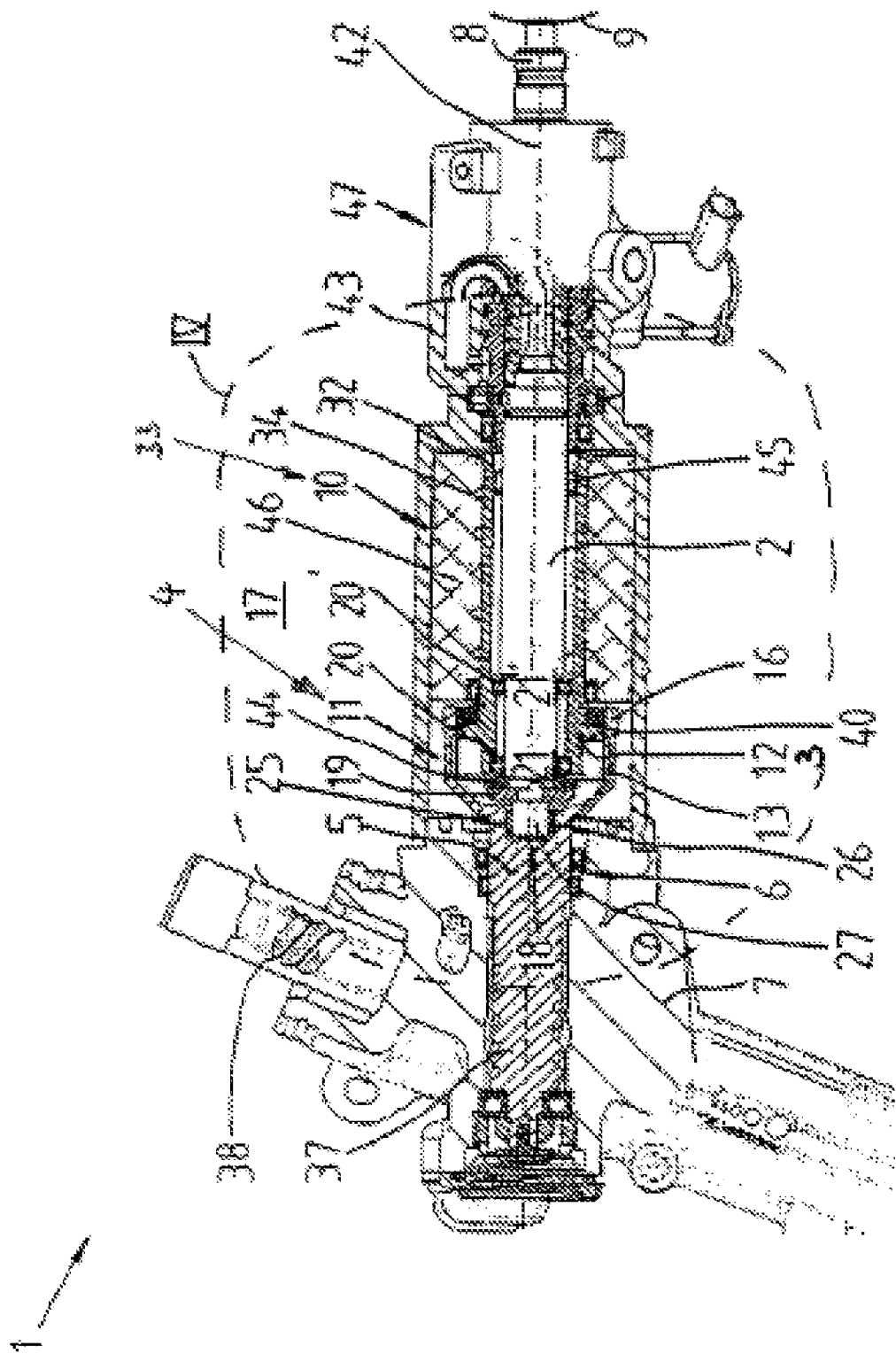
FIG. 3 is a longitudinal cross-sectional view through a further superimposed steering system.
Figure 4:
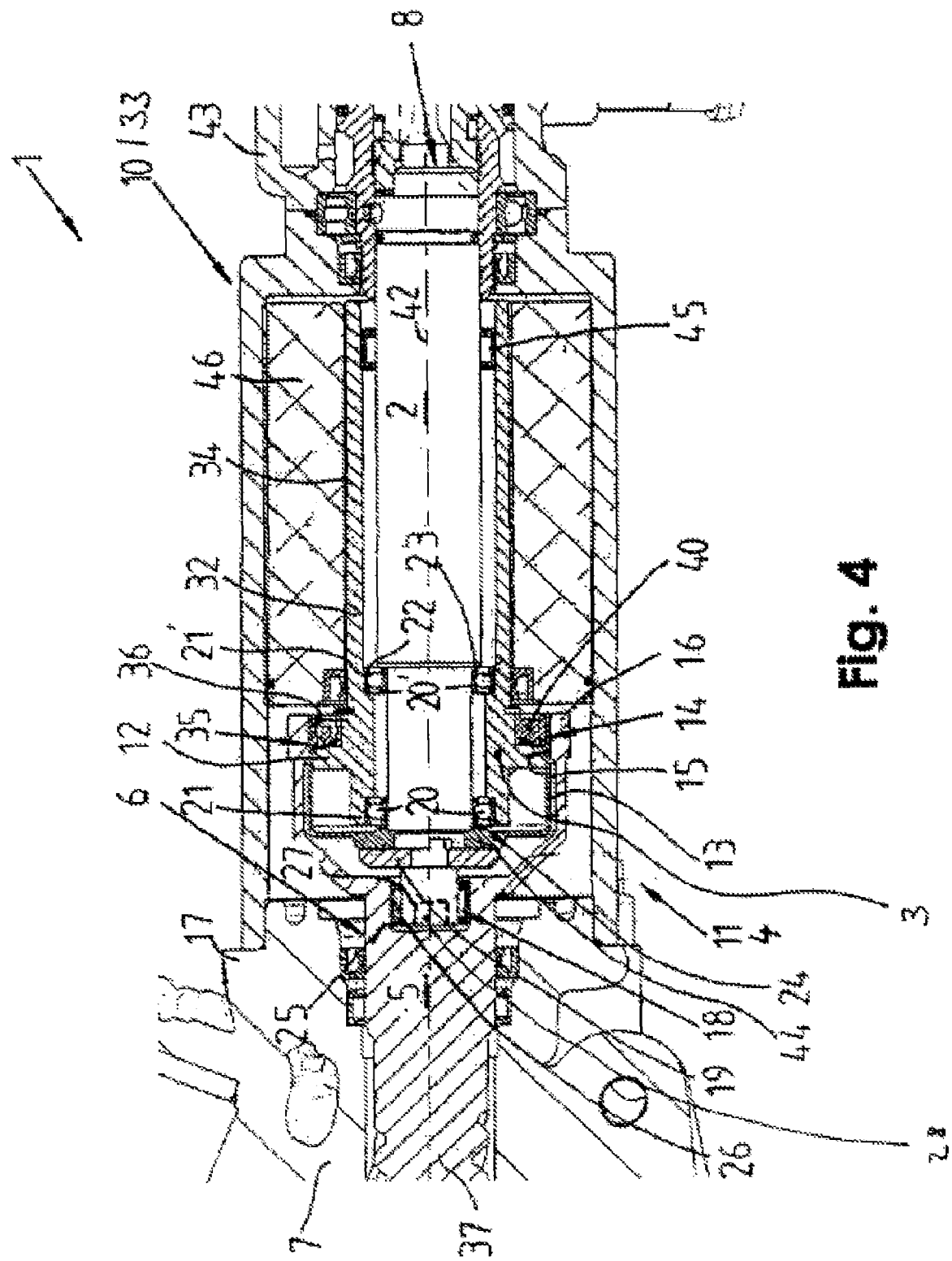
FIG. 4 illustrates detail IV illustrated in FIG. 3.

In order to provide and mount the harmonic drive 11 inexpensively, it may be arranged in such a functional manner that it may be constructed without a housing, although it may be provided to arrange it in a housing 43 on the steering gear 7 (cf., FIGS. 3, 4).

The steering shaft 8 is separated in the axial region x of the circular spline 16 and is divided into a first gear unit input shaft 2 which is connected fixedly in terms of rotation to the steering handle 9 and at the other end of which the drive core 12 and the radially flexible flexspline 13 are arranged, and into a gear unit output shaft 5 which is connected fixedly in terms of rotation to the circular spline 16 and the input shaft 6. In this manner, the gear unit output shaft 5 may be rotated by the harmonic drive 11 relative to the first gear unit input shaft 2 and a steering angle which is dependent on driving and vehicle parameters may be input into the steering shaft 8 ahead of the steering gear 7.

For relatively easy assembly, for any possible simple exchanging of parts of the harmonic drive 11 and in order for it to be possible also to manufacture the parts of the harmonic drive from different materials using conventional manufacturing processes, the first gear unit input shaft 2 is connected in a form-fittingly releasable manner to the radially flexible flexspline 13. The torque transmission from the first gear unit input shaft 2 to the radially flexible flexspline 13 is carried out by a clutch plate 19 which protrudes into the radially flexible flexspline 13 and the first gear unit input shaft 2 with the aid of latching elements. The clutch plate 19 is fixed releasably on the end side of the first gear unit input shaft 2 which protrudes into the circular spline 16, by a connecting element 18 which is configured as a threaded bolt and protrudes into the first gear unit input shaft 2.

As FIGS. 1 to 4 illustrate, a disk spring 24 is clamped axially between an inner ring 23 of the roller bearing 20 and an annular flange 44 of the radially flexible flexspline 13. The disk spring 24 prestresses the roller bearing 20 and positions the drive core 12 on the first gear unit input shaft 2 without play. The disk spring 24 may also act on the outer ring 22 of the roller bearing 20.

In a longitudinal cross-sectional view through a superimposed steering system 1, the servomotor 10 of which is configured as a hollow shaft motor 33, FIGS. 3 and 4 illustrate that the first gear unit input shaft 2 does not necessarily have to be mounted in a floating manner in the harmonic drive 11, but rather that the first gear unit input shaft 2 may be mounted by a bearing 25 in the circular spline 16 or in the first gear unit output shaft 5. The bearing 25 is configured as a needle bush 26 and radial bearing, a form-fittingly releasable bearing journal 27 on the end face of the first gear unit input shaft 2 protruding into the needle bush 26. The bearing journal 27 has a hexagon socket and thus serves at the same time as a connecting element 18 for fixing the clutch plate 19 and the radially flexible flexspline 13 to the first gear unit input shaft 2. In all the exemplary embodiments illustrated, a head of the connecting element 18 protrudes axially into the gear unit output shaft 5, as a result of which the overall size of the harmonic drive 11 may become more compact.

The hollow shaft motor 33 is arranged coaxially with respect to the longitudinal axis 42 of the steering shaft 8. The first gear unit input shaft 2 of the steering shaft 8 penetrates the servomotor 10, a rotor 34 of the servomotor 10 being arranged on the servomotor shaft 32 so as to rotate around the steering shaft 8. The servomotor shaft 32 is of one-piece configuration with the drive core 12 and is mounted with the aid of the roller bearings 20, 20' and the needle bush 26 in the gear unit output shaft 5 and a further needle bush 45 between the first gear unit input shaft 2 and the servomotor shaft 32. The further needle bush 45 is arranged at an axial spacing from the roller bearings 20, 20'.

The stator 46 of the servomotor 10 is arranged fixedly on the housing 43 which encloses the harmonic drive 11, the servomotor 10 and a control and/or regulating device 47. The harmonic drive 11, the servomotor 10 and the control and/or regulating device 47 are arranged in the housing 43 such that they are separated spatially and are shielded from one another.

Instead of the form-fitting engagement of the outer circumferential surface 14 of the flexspline 13 with the internal toothing system 36 of the circular spline 16, it may be provided to provide a frictional engagement of the outer circumferential surface 14 with the cylindrical supporting surface 15 of the circular spline 16, as a result of which any desired decelerative transmission ratios may be selected, the denominator of which is not an integer. Moreover, fine tooth spacings, corrugations or knurling may be provided.

LIST OF REFERENCE CHARACTERS

1 Superimposed steering system
2 Gear unit input shaft, first
3 Gear unit input shaft, second
4 Variable ratio gear unit
5 Gear unit output shaft
6 Input shaft
7 Steering gear
8 Steering shaft
9 Steering handle
10 Servomotor
11 Harmonic drive
12 Drive core, eccentric
13 Flexspline, radially flexible
14 Outer circumferential surface, of 12
15 Supporting surface, cylindrical
16 Circular spline
17 Component, fixed to the vehicle
18 Connecting element
19 Clutch plate
20, 20' Roller bearing
21, 21' End, axial of 12
22 Outer ring
23 Inner ring
24 Disk spring
25 Bearing
26 Needle bush
27 Bearing journal
28 Depression
29 Gear unit
30 Flexible drive mechanism
31 Pulley wheel
32 Servomotor shaft
33 Hollow shaft motor
34 Rotor
35 External toothing system
36 Internal toothing system
37 Pinion, helically toothed
38 Rack
39 Toothed belt
40 Ball bearing
41 Circumferential section
42 Longitudinal axis, of 8
43 Housing, of 11
44 Annular flange
45 Needle bush
46 Stator
47 Control and/or regulating device
48
49
50
x Region, axial of 16

The invention claimed is:

1. A superimposed steering system for a vehicle, comprising:
a variable ratio gear unit including a first gear unit input shaft and a second gear unit input shaft and configured as a harmonic drive for superimposition of rotational angles which occur at the two gear unit input shafts onto a gear unit output shaft of the variable ratio gear unit, the gear unit output shaft adapted to act on an input shaft of a steering gear, the first gear unit input shaft operatively connected to a steering handle by a steering shaft and the second gear unit input shaft operatively connected to a servomotor, the first gear unit input shaft connected releasably to a radially flexible flexspline of the harmonic drive and penetrating an eccentric drive core of the harmonic drive, the eccentric drive core protruding into the radially flexible flexspline, the servomotor is supported on one of (a) another component, fixed to the vehicle, of the superimposed steering system and (b) the vehicle other than on a steering column,
wherein the gear unit output shaft rotates relative to the first gear unit input shaft.

2. The superimposed steering system according to claim 1, wherein the superimposed steering system is arranged as one of (a) a power steering system and (b) a power-assisted steering system for a motor vehicle.

3. The superimposed steering system according to claim 1, wherein the eccentric drive core is mounted on the first gear unit input shaft by roller bearings at its axial ends.

4. The superimposed steering system according to claim 3, wherein one of (a) an outer ring and (b) an inner ring of a roller bearing is prestressed axially.

5. The superimposed steering system according to claim 1, wherein the servomotor is operatively connected to the second gear unit input shaft by a gear unit.

6. The superimposed steering system according to claim 5, wherein the gear unit is arranged as a gear mechanism.

7. The superimposed steering system according to claim 5, wherein the gear unit includes at least one of (a) a spur gear mechanism, (b) a helical gear mechanism and (c) a bevel gear mechanism.

8. The superimposed steering system according to claim 6, wherein the eccentric drive core is of one-piece configuration with the second gear unit input shaft and a gear wheel of the gear unit.

9. The superimposed steering system according to claim 5, wherein the gear unit is arranged as a flexible drive mechanism.

10. The superimposed steering system according to claim 9, wherein the eccentric drive core and the second gear unit input shaft are of one-piece configuration with a pulley wheel of the gear unit.

11. The superimposed steering system according to claim 1, wherein at least one of (a) a current supply and (b) a signal forwarded to the servomotor occurs without sliders and without flat spiral springs.

12. The superimposed steering system according to claim 1, wherein the harmonic drive is formed substantially from steel.

13. The superimposed steering system according to claim 1, wherein the harmonic drive is formed substantially from plastic.

14. The superimposed steering system according to claim 1, wherein the variable ratio gear unit is arranged one of (a) between a steering moment sensor and the steering gear and (b) between the steering handle and the steering gear for an electric power assistance steering system.

15. A superimposed steering system for a vehicle, comprising:
a variable ratio gear unit including a first gear unit input shaft and a second gear unit input shaft and configured as a harmonic drive for superimposition of rotational angles which occur at the two gear unit input shafts onto a gear unit output shaft of the variable ratio gear unit, the gear unit output shaft adapted to act on an input shaft of a steering gear, the first gear unit input shaft operatively connected to a steering handle by a steering shaft and the second gear unit input shaft operatively connected to a servomotor, the first gear unit input shaft connected releasably to a radially flexible flexspline of the harmonic drive and penetrating an eccentric drive core of the harmonic drive, the eccentric drive core protruding into the radially flexible flexspline, the servomotor is supported on one of (a) another component, fixed to the vehicle, of the superimposed steering system and (b) the vehicle other than on a steering column,
wherein the servomotor is adapted to provide a torque and rotational angle to the eccentric drive core on the second gear unit input shaft of the harmonic drive, the radially flexible flexspline connected to the first gear unit input shaft in a form-fitting and releasable manner, at least one circumferential section of an outer circumferential surface of the radially flexible flexspline is in engagement in a continuously changeable manner with a substantially cylindrical supporting surface of a circular spline, and the spline is connected rotationally fixedly to the gear unit output shaft.

16. The superimposed steering system according to claim 15, wherein the first gear unit input shaft is mounted in the circular spline by a bearing.

17. The superimposed steering system according to claim 16, wherein the bearing is arranged as a needle bush.

18. The superimposed steering system according to claim 16, wherein the first gear unit input shaft is mounted in the bearing with a form-fittingly releasable bearing journal.

19. The superimposed steering system according to claim 18, wherein a depression having a cross-section that deviates from a circular shape is arranged in the bearing journal.

20. The superimposed steering system according to claim 15, wherein the eccentric drive core is formed in one piece with a servomotor shaft which forms the second gear unit input shaft.

21. The superimposed steering system according to claim 20, wherein the servomotor is arranged as a hollow shaft motor, a rotor of the servomotor arranged rotatably about the steering shaft.

22. The superimposed steering system according to claim 15, wherein the flexspline has an external toothing system in engagement with an internal toothing system of the circular spline.

23. A superimposed steering system for a vehicle, comprising:
a variable ratio gear unit including a first gear unit input shaft and a second gear unit input shaft and configured as a harmonic drive for superimposition of rotational angles which occur at the two gear unit input shafts onto a gear unit output shaft of the variable ratio gear unit, the gear unit output shaft adapted to act on an input shaft of a steering gear, the first gear unit input shaft operatively connected to a steering handle by a steering shaft and the second gear unit input shaft operatively connected to a servomotor, the first gear unit input shaft connected releasably to a radially flexible flexspline of the harmonic drive and penetrating an eccentric drive core of the harmonic drive, the eccentric drive core protruding into the radially flexible flexspline, the servomotor is supported on one of (a) another component, fixed to the vehicle, of the superimposed steering system and (b) the vehicle other than on a steering column,
wherein the radially flexible flexspline is fixed on the first gear unit input shaft by a connection element and a clutch plate.

24. A superimposed steering system for a vehicle, comprising:
a variable ratio gear unit including a first gear unit input shaft and a second gear unit input shaft and configured as a harmonic drive for superimposition of rotational angles which occur at the two gear unit input shafts onto a gear unit output shaft of the variable ratio gear unit, the gear unit output shaft adapted to act on an input shaft of a steering gear, the first gear unit input shaft operatively connected to a steering handle by a steering shaft and the second gear unit input shaft operatively connected to a servomotor, the first gear unit input shaft connected releasably to a radially flexible flexspline of the harmonic drive and penetrating an eccentric drive core of the harmonic drive, the eccentric drive core protruding into the radially flexible flexspline, the servomotor is supported on one of (a) another component, fixed to the vehicle, of the superimposed steering system and (b) the vehicle other than on a steering column,
wherein the eccentric drive core is mounted on the first gear unit input shaft by roller bearings at its axial ends,
wherein one of (a) an outer ring and (b) an inner ring of a roller bearing is prestressed axially, and
wherein the one of (a) the outer ring and (b) the inner ring of the roller bearing is prestressed axially with a disk spring.

25. The superimposed steering system according to claim 24, wherein the disk spring is supported on the clutch plate by the radially flexible flexspline.

* * * * *